United States Patent
Miyamae

[11] 3,769,737
[45] Nov. 6, 1973

[54] FISHING LINE GUIDE DEVICE

[76] Inventor: Toshiaki Miyamae, 292, Nishi-Iwata, Higashi-Osaka, Japan

[22] Filed: July 5, 1972

[21] Appl. No.: 269,028

[30] Foreign Application Priority Data
Oct. 30, 1971  Japan.................................. 46/86653

[52] U.S. Cl........................ 43/25, 43/24, 242/84.43
[51] Int. Cl.............................................. A01k 87/00
[58] Field of Search................................. 43/25, 24; 242/84.41, 84.43

[56] References Cited
UNITED STATES PATENTS

| | | | |
|---|---|---|---|
| 2,305,045 | 12/1942 | Torrence | 43/25 X |
| 2,564,086 | 8/1951 | Von Beck | 242/84.43 |
| 3,156,998 | 11/1964 | McDaniel | 43/25 X |
| 3,598,334 | 8/1971 | Fleischer | 242/84.41 |
| 3,624,798 | 11/1971 | Fleischer | 242/84.41 |

Primary Examiner—Louis G. Mancene
Assistant Examiner—Daniel J. Leach
Attorney—Raymond C. Stewart et al.

[57] ABSTRACT

In a fishing line guide device usable with fishing reels of a type adapted to be mounted on a fishing rod at a right angle with the axis thereof, said device being operable by use of the running motion of a fishing line that is being retrieved to the reel, thereby uniformly rewinding the line to the reel. The device is further provided with a means for controlling the interval at which the fishing line is to be rewound on the reel through the full length thereof.

9 Claims, 7 Drawing Figures

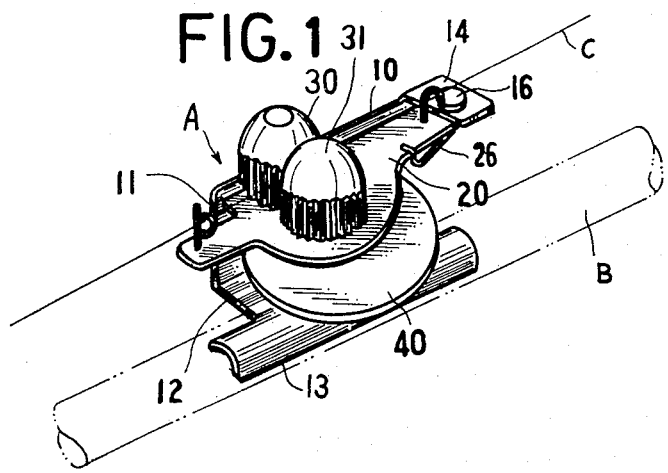
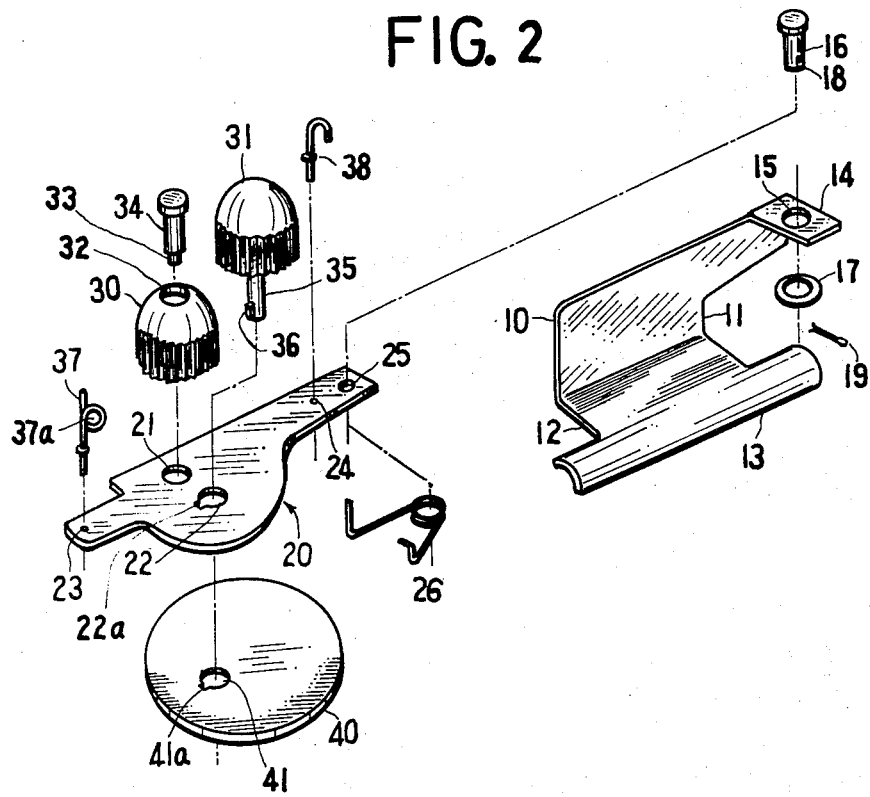

FISHING LINE GUIDE DEVICE

The present invention relates to a fishing line guide device for rewinding the fishing line, and more particularly it relates to a novel fishing line guide device detachably mountable forward of a fishing reel thereby guiding the fishing line to be rewound uniformly on the reel with equal tension.

Especially in case of angling on a fishing boat, some hundred feet of fishing line is dropped deep in the sea so that in order to pull in a catch, or to adjust the underwater length of the fishing line, it is customary to employ a cross face type or drum spool type fishing reel whose spool shaft is adapted to rotate transversely of a fishing rod for rewinding the stretched line either electrically or by hand.

However, the trouble with the standard cross face type or drum type fishing reels employed for the above-mentioned purposes is that, due to the fishing line being rewound randomly with irregular tension on the spool of the reel through its full length, an angler often fails to drop the fishing line in a desired depth of water or stretch it to a desired length over the sea because the fishing line easily gets entangled with itself in its randomly rewound portions. Thus before winding back the fishing line on the reel for the fishing purpose, he must waste a lot of time in unraveling the tightened entanglement of the fishing line with painstaking efforts and no more occasions he must cut such an entangled line in its suitable positions and tie it up with the main fishing line so as to form a continuity of fishing line.

Accordingly, an angler ever experienced in the above-mentioned trouble with the cross face type or drum type fishing reel would intrinsically put one of his fingers on the reel portion and move it along the axis of the spool according as he rewinds the fishing line so as to allow the line to be rewound uniformly with equal tension on the spool through the full length thereof.

With the view to obviating the above-mentioned drawbacks, it is proposed to provide such a cross face type or drum type fishing reel that a spool is adapted to move back and forth along its axis traversing at a right angle with the length of a fishing rod: however, in order to allow the spool to reciprocate along its shaft, it is necessary to pivotally and slidably support the spool on the shaft which is substantially twice as long as the axial length of the spool.

Further there is also being sold on the market another form of improved cross face type or drum type fishing reel wherein a travelling line guide means is adapted to move back and forth along a double-threaded screw shaft mounted on both edge plates of a drum spool in such a manner that said screw shaft is rotated synchronously with rotation of a reel shaft through a reduction gear housed in one of said edge plates. However, this type is disadvantageous in that it is complicated in structure and very high in the cost of manufacture.

As is clearly exemplified, the mechansim of the existing fishing line guide device is provided exclusively on some limited luxurious types of fishing reels and if a single part of such mechansim be broken unrepairedly in the reel body, the body itself must be exchanged to a new one at an extra expensive purchasing cost.

Accordingly, it is one of the main objects of the present invention to provide such a novel type fishing line guide device that can be manufactured as an independent product and used on a fishing rod independently of the standard type reel that is not provided with a fishing line guide mechanism.

It is another object of the invention to provide a unique type of fishing line guide device which can guide the fishing line to be uniformly rewound on a fishing reel without producing entangled line portions at whatever speed the fishing line may be being rewound electrically or by hand; the rewinding operation being effected by frictionally transmitting to a line guide means the travelling force of the fishing line without resorting to a separate driving means.

It is another object of the invention to provide a fishing line guide device through which an angler is able to selectively control the length of a fishing line subject to the conditions where he is angling either on the beach or on a fishing boat.

It is a still further object of the invention to provide a fishing line guide device which, in addition to being simple in structure and producible at a low cost, is suitable for use in combination with all the existing cross face type or drum type fishing reels.

These and other objects of the invention will become apparent in the following description and claims made with reference to the accompanying drawings, in which:

FIG. 1 is a perspective view of a fishing line guide device embodying the present invention, in which the elemental parts of the means are partially shown;

FIG. 2 is an exploded view schematically showing the elemental parts of mechanical construction thereof;

Figure 5:
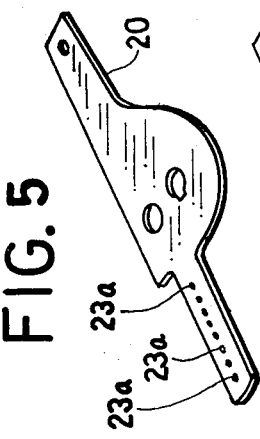
FIG. 5 is a perspective view showing a modification of a guide pin mounting mechanism adapted to adjust the swinging motion of the device subject to a reel to which the device is applied.

Setting forth in detail some of the preferred embodiments carrying out the present invention with reference to the accompanying drawing, the fishing line guide device A in accordance with the present invention generally comprises a bracket 10, a flat surface plate 20 swingably pivoted to said bracket 10, a pair of rollers 30, 31 supported relatively rotatable on the flat surface of said plate 20, and a discoidal cam 40 connected to said roller 31 in contactable relation with the bracket 10 as shown in FIG. 1.

Said bracket 10 includes a vertical portion 11, a horizontal portion 12 formed integral with each other to present a substantially L shape in section. The bracket 10 further includes a rod fixing member 13 for securing the device A to a fishing rod B and a horizontal bracket arm 14. Said bracket arm 14 is bored with a perforated hole 15 through which a pivot 16 is to be inserted for the subsequently described purpose.

The plate 20 is provided with a pair of holes 21, 22 spaced equally from the fishing line C which runs therebetween. The plate 20 is further provided with a pair of spaced holes 23, 24 so that a pair of guide pins 37, 38 to be described subsequently can be mounted in said holes 23, 24 in opposed relation with each other. Said hole 24 is preferably formed in the position of the plate 20 closely adjacent to the pivot 16, and if possible, it may be provided on the bracket arm 14 so that a fishing line C running from a guide ring provided at a fishing rod end toward the line guide device A can make a rectilinear motion and prevent undesired vibration of the narrow and flexible forward portion of a fishing rod B.

Adjacent to the end of the plate 20 at the side of said hole 24 there is bored a hole 25 that corresponds to the hole 15 in the horizontal arm 14 of the bracket 10. The pivot 16 is inserted through said holes 15, 25 and a spring 26 is mounted to the pivot 16 in a manner that the plate 20 is normally held in contact with the vertical portion 11 of the bracket 10. Thereafter, a washer 17 is mounted to the pivot 16 and supported for example by means of a split pin 19 inserted into a lateral hole 18 perforated close to the end of the pivot 16.

Said pair of rollers 30 and 31 are made of rubber or synthetic resin material having a suitable hardness and are peripherally rough-surfaced so that they can be frictionally rotated by the running motion of a fishing line C when it is forcibly drawn between the contacted rough surfaces of the rollers 30 and 31 toward a reel mounted rearwardly of the line guide device A.

The head of each roller 30 and 31 is preferably formed into a dome shape so that when the fishing line C slips off the rollers 30, 31 the angler can easily put the line C between the rollers 30 and 31 to rewind it onto a reel D.

Said roller 30 is bored axially thereof with a perforated hole 32 through which a shaft 33 preferably covered with a sleeve 34 is inserted and rigidly fixed to the hole 21 whereby said roller 30 is rotatably supported on the flat surface of the plate 20.

The other roller 31 is provided downwardly thereof with a blind center hole (not shown in the drawings), into which a shaft 35 is forced in fixed relation with said roller 31.

As is shown in FIG. 2 the foremost end of the shaft 35 has a projection 36 so that it presents a key hole shape in section.

Incidentally, the hole 22 of the plate 20 has a key channel shape portion 22a so as to permit said foremost end of the shaft 35 to pass therethrough. Likewise the cam 40 has in its eccentric position a key hole 41 having a key channel shape portion 41a to correspond to said foremost end of the shaft 35. Thus, the shaft 35 is inseparably connected to the roller 31 is passed through said key hole 22 of the plate 20 and forced into the key hole 41 of the cam 40 thereby connecting said other roller 31 to the cam 40 through the shaft 35 in rotatable relation with each other.

However, this connection of the roller 31 to the cam 40 may be possible by forming a channel on one side of the foremost end of the shaft 35 or flattening said one side to form a flat surface so as to forcibly insert a spline (not shown in the drawings) between said key channel portion 41a and said channel or flat surface.

In the hole 23 of the plate 20 is inserted a first guide pin 37 having a line insertion eye 37a and in the hole 24 is inserted a second guide pin 38 which is formed for example into a J shape so that the fishing line C can be easily put in and off the second guide pin 38.

The guide device A of the present invention constructed in the above-mentioned manner is fixedly mounted to a fishing rod B forwardly of a reel D, and the fishing line C is inserted into said first guide pin 37, held between the rollers 30 and 31 thereafter being put in the second guide pin 38.

Figure 3:
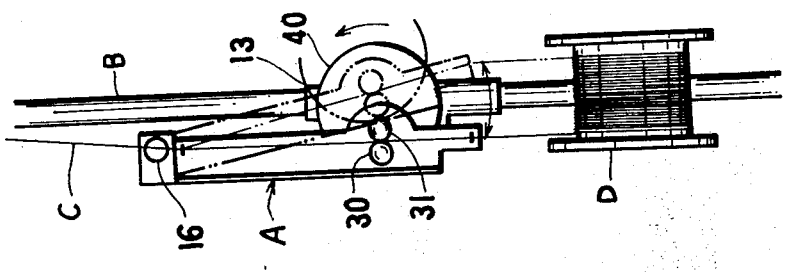
FIG. 3 is a schematic diagram showing the positional relation of the line guide device of the invention to a reel and a fishing rod.

When the line C is rewound onto the reel, the rollers 30 and 31 are relatively rotated by the running force of the line C. In this case, the cam 40 is also rotated synchronously with rotation of the rollers 30 and 31 through the shaft 35 in a manner that the outer periphery of the cam 40 is always held in frictional contact with the vertical portion 11 of the bracket 10 under the influence of resiliency of the spring 26, the result being that the plate 20 is made to sway on the pivot 16 with respect to the vertical portion 11, as is shown in FIG. 3.

Accordingly, the line C running toward a reel D through the first guide pin 37 is also made to swing while being transferred toward the reel D.

Figure 6:
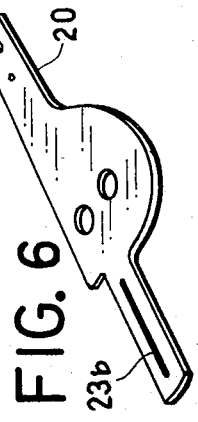
FIG. 6 is likewise a perspective view showing another modification thereof.

Incidentally, the cam 40 is shaped to form such a heart cam configuration as can reciprocate the first guide pin 37 at an equal speed. Moreover, the hole 23 for receiving the first guide pin 37 may be replaceable with a plurality of holes 23a provided on the plate 20 lengthwise thereof as shown in FIG. 5, so that the swinging motion or amplitude of the first guide pin 37 can be optionally changed merely by fixing the guide pin 37 in any selected one of the holes 23a subject to the length of a spool of the reel D to which the line guide device A is applied. Instead of the above-mentioned holes 23 and 23a, the selection of the amplitude of the first guide pin 37 is also available by forming a slot 23b on the plate 20 lengthwise thereof as shown in FIG. 6 so that the first guide pin 37 can be slid along the slot 23b to be fixed in any desired position thereof subject to the length of a spool of the reel D to which the line guide device A is applied. Furthermore, the purpose of said selection can also be accomplished by changing the eccentric position of the cam 40.

Figure 4:
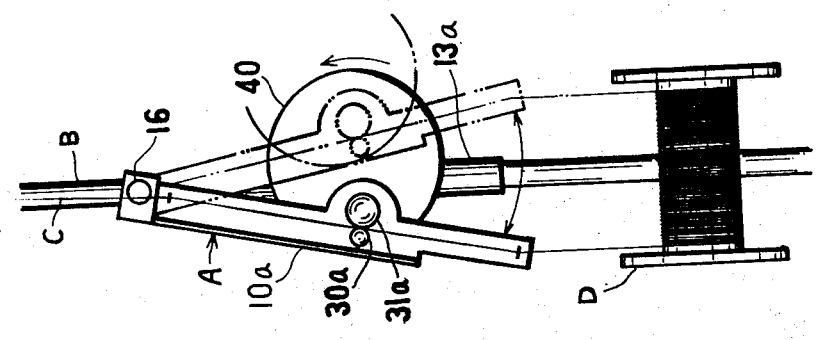
FIG. 4 is a schematic diagram showing a modified example thereof.

The swinging speed of the first guide pin 37 can be easily reduced by using a pair of rollers 30a and 31a, of which the roller 31a has a relatively large diameter as is shown in FIG. 4.

Generally, most of the existing standard cross face type and drum type reels are so formed that when they are mounted on a fishing rod B, the center of the spool shaft thereof is positioned on the axis of the rod B.

Figure 7:
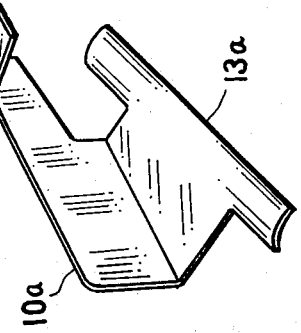
FIG. 7 is a perspective view showing a bracket used in the modification shown in FIG. 4 which facilitates more uniform rewinding of the fishing line onto the reel.

Accordingly, in order to uniformly rewind a fishing line C on such a reel D through its full length by using the line guide device A of the present invention, the angle at which the device A is to be positioned with respect to the axis of a fishing rod B is pre-determined, thereby controlling the amplitude of the first guide pin 37 as shown in FIGS. 4 and 7. For that purpose, the device A of the invention is so formed as to be mounted on a fishing rod B in such a position that in an equilateral triangle constructed with the pivot 16 as its apex and with the maximum amplitude of the first guide pin 36 as its base, an extension line bisecting the vertical angle of the triangle can meet exactly with the axis of the fishing rod B.

By so arranging, the fishing line C from the end guide of a fishing rod B is transferred normally along the axis of the rod to the second guide pin 38 mounted on or adjacent to the pivot 16 without producing extra vibration on the narrow, flexible forward rod portion, and when it reaches the first guide pin 37, it is made to sway by said guide pin 37 to a pre-determined extent as is shown in FIG. 4, consequently enabling an angler not only to enjoy the exciting feeling of a fish responding through the rod B but also to uniformly rewind the line C on the reel D with equal tension.

While but a few preferred embodiments of the invention have been particularly shown and described, it is distinctly understood that the present invention, illustrated and described in detail in the drawings and foregoing description, is to be considered as illustrative and restrictive in character, and that all changes and modifications that come within the spirit of the present invention are included.

While I have disclosed some embodiments of the present invention, it is to be understood that these embodiments are given by example only and not in a limiting sense.

I claim:

1. A fishing line guide device to be used with a fishing reel comprising
   a pair of friction rollers opposedly mounted so as to be relatively rotated by the running motion of a fishing line,
   a plate means for pivotally supporting said pair of rollers,
   a shaft means connected to one of said rollers,
   a cam means connected to said shaft means rotatable in synchronism with said one of the rollers,
   a bracket means having a surface with the outer periphery of said cam means being slidably contactable therewith,
   a resilent means mounted for urging said plate means against said bracket means surface,
   a first guide means mounted adjacent to one end of said plate means, and
   a second guide means mounted on the other end of said plate means.

2. The fishing line guide device, as set forth in claim 1, wherein
   each of said rollers comprises a roller body made of relatively hard synthetic resin, and a roughly surfaced frictionable outer periphery.

3. The fishing line guide device, as set forth in claim 1, wherein
   each of said rollers comprises a roller body made of vulcanized rubber, and a roughly surfaced frictionable outer periphery.

4. The fishing line guide device, as set forth in claim 1, wherein
   said one of the rollers connected to said cam means through said cam shaft is substantially greater in diameter than the other roller.

5. The fishing line guide device, as set forth in claim 1, wherein said bracket means surface is,
   a vertical portion,
   said vertical portion having an integral bracket arm at its one end for swingably supporting said plate means,
   said resilient means being mounted on said bracket arm.

6. The fishing line guide device, as set forth in claim 1, wherein
   said plate means is provided lengthwise thereof with a plurality of holes for selectively receiving said first guide means.

7. The fishing line guide device, as set forth in claim 1, wherein
   said plate means is provided lengthwise thereof with a slot means for slidably receiving said first guide means.

8. The fishing line guide device, as set forth in claim 1, wherein
   said cam means includes a disc member, having a hole formed eccentrically therein for receiving one end of said cam shaft means, and a projection formed on said one end of said cam shaft means.

9. The fishing line guide device, as set forth in claim 1, which includes
   a means for detachably mounting said device to a fishing rod.

* * * * *